United States Patent
Andresson

(10) Patent No.: US 7,842,908 B2
(45) Date of Patent: Nov. 30, 2010

(54) SENSOR FOR EYE-SAFE AND BODY-FIXED SEMI-ACTIVE LASER GUIDANCE

(75) Inventor: Clarence C. Andresson, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 758 days.

(21) Appl. No.: 11/891,982

(22) Filed: Aug. 14, 2007

(65) Prior Publication Data

US 2010/0108859 A1     May 6, 2010

(51) Int. Cl.
    *G01C 21/02*     (2006.01)
    *H01J 40/14*     (2006.01)
(52) U.S. Cl. ................................ 250/203.1; 250/214 R
(58) Field of Classification Search .............. 250/214.1, 250/203.2, 203.1, 214 R, 214 VT, 221; 345/7, 345/8; 244/3.15–3.17; 356/4.01, 4.07, 140, 356/141.1, 141.2, 141.5
See application file for complete search history.

(56) References Cited

U.S. PATENT DOCUMENTS

| | | | | |
|---|---|---|---|---|
| 4,593,187 A | * | 6/1986 | Grotts et al. | 250/208.1 |
| 4,857,721 A | * | 8/1989 | Dunavan et al. | 250/206.1 |
| 5,604,695 A | * | 2/1997 | Cantin et al. | 356/121 |
| 7,265,331 B2 | * | 9/2007 | Muenter et al. | 250/208.2 |
| 2004/0208439 A1 | | 10/2004 | Bell et al. | |
| 2006/0065817 A1 | | 3/2006 | Asada et al. | |
| 2006/0266927 A1 | | 11/2006 | Kimber | |

OTHER PUBLICATIONS

"International Application Serial No. PCT/US2008/09738, Search Report mailed Apr. 29, 2009", pp. 4.
"International Application Serial No. PCT/US2008/09738, Written Opinion mailed Apr. 29, 2009", pp. 8.

* cited by examiner

*Primary Examiner*—Que T Le
*Assistant Examiner*—Pascal M Bui-Pho
(74) *Attorney, Agent, or Firm*—Schwegman, Lundberg & Woessner, P.A.; Gregory J. Gorrie

(57) ABSTRACT

A sensor for laser spot trackers. The novel sensor includes a detector array comprised of a predetermined number of subsets, each subset including a plurality of detector elements, and a readout circuit for providing a first output and a second output, the first output including subset signals that represent the total energy received in each subset and the second output including signals representing energy received by each individual detector element. In an illustrative embodiment, the array is divided into four subsets and the first output includes four subset signals that are compatible with four-quadrant guidance systems. A subset signal is generated by thresholding signals received from each individual detector element to remove noise, and then summing the thresholded signals from each detector element in the subset.

19 Claims, 9 Drawing Sheets

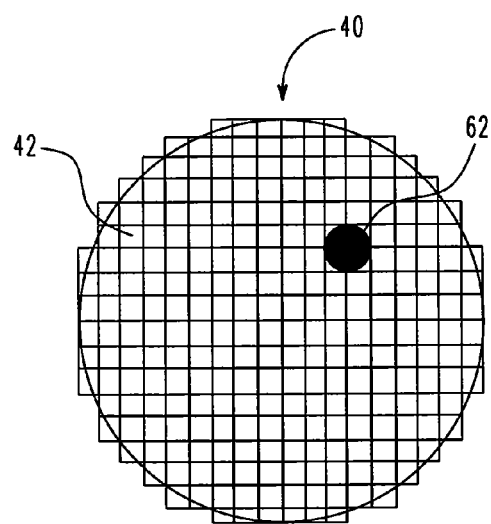
FIG. 6
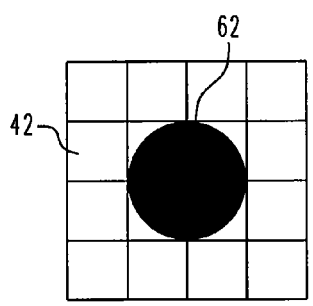 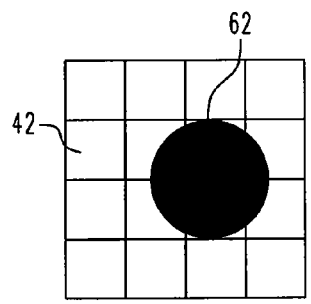 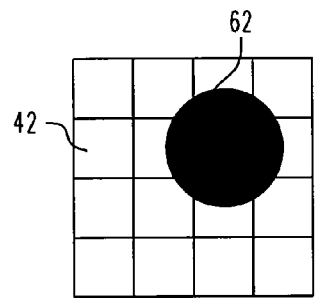
FIG. 7a   FIG. 7b   FIG. 7c

SENSOR FOR EYE-SAFE AND BODY-FIXED SEMI-ACTIVE LASER GUIDANCE

BACKGROUND OF THE INVENTION

1. Field of the Invention

The present invention relates to optical and electrical systems. More specifically, the present invention relates to sensors for laser guidance systems and laser spot trackers.

2. Description of the Related Art

Laser spot trackers are systems used for measuring the position of a laser spot, and are commonly used in missile guidance systems to guide a missile toward a designated target. In a semi-active laser guidance system, for example, a laser designator is pointed at a target, forming a laser spot on the target. A spot tracker or seeker on the missile senses the laser signal reflected from the target and measures the angle between the location of the laser spot and the missile heading. This angle measurement is then used to guide the missile toward the target.

Conventional laser guidance systems typically utilize non-eye safe designators (usually 1.06 μm lasers), thus putting friendly forces and non-combatants at risk of eye damage. Eye safety is of particular concern for smaller precision weapons that may be used in urban environments (for example, to target a single room in a building, a stationary or moving vehicle, or a small boat in a harbor) and also for spot trackers used in non-weaponry applications (such as imaging or reconnaissance).

New laser technology has been developed that can generate eye-safe laser energy at wavelengths that are not harmful to the eye (such as 1.54 μm). Detectors that are capable of measuring energy at these wavelengths, however, have been more difficult to develop. Most conventional detectors are made from silicon, which responds to wavelengths up to about 1 μm but will not respond to the longer, eye-safe wavelengths. Newer detector materials such as InGaAs or HgCdTe will respond to eye-safe laser wavelengths (as well as the more common 1.06 μm lasers), but detectors made from these materials must typically be very small due to the high capacitance of the material. A wide field of view therefore cannot be achieved without using either a large array of detectors or a scanning mechanism (e.g., a gimbal).

Gimbaled sensors can provide high angle measurement accuracy for a wide field of view, but are typically very expensive. Cost is often an important factor for laser spot trackers, particularly when used in missiles and small munitions. These applications usually prefer a body-fixed sensor without a gimbal.

Body-fixed sensors for laser guidance typically use a four-quadrant design, a simple and low cost approach that uses a single large detector that is divided into four quadrants. The missile is guided toward the laser spot by centering the received energy on the detector such that equal amounts of energy are detected in each quadrant. Four-quadrant detectors are typically made from conventional detector materials such as silicon. Eye-safe detectors made from InGaAs or HgCdTe would need to be arranged in a large array in order to achieve the same field of view as a conventional body-fixed sensor. Large detector arrays, however, are not compatible with existing four-quadrant designs.

Hence, a need exists in the art for an improved body-fixed sensor that can detect eye-safe lasers and which is compatible with existing laser guidance systems.

SUMMARY OF THE INVENTION

The need in the art is addressed by the sensor for laser spot trackers of the present invention. The novel sensor includes a detector array comprised of a predetermined number of subsets, each subset including a plurality of detector elements, and a readout circuit for providing a first output and a second output, the first output including subset signals that represent the total energy received in each subset and the second output including signals representing energy received by each individual detector element. In an illustrative embodiment, the array is divided into four subsets and the first output includes four subset signals that are compatible with four-quadrant guidance systems. A subset signal is generated by thresholding signals received from each individual detector element to remove noise, and then summing the thresholded signals from each detector element in the subset.

BRIEF DESCRIPTION OF THE DRAWINGS

FIG. 6 is a simplified schematic of a detector array designed in accordance with an illustrative embodiment of the present invention, showing an example scenario in which energy from a laser spot falls on a few detector elements in one quadrant of the array.

FIG. 7a shows an example in which a laser spot is centered between four detector elements in a multi-element detector array designed in accordance with an illustrative embodiment of the present invention.

FIG. 7b shows an example in which a laser spot is centered between two detector elements in a multi-element detector array designed in accordance with an illustrative embodiment of the present invention.

FIG. 7c shows an example in which a laser spot is centered on a single detector elements in a multi-element detector array designed in accordance with an illustrative embodiment of the present invention.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
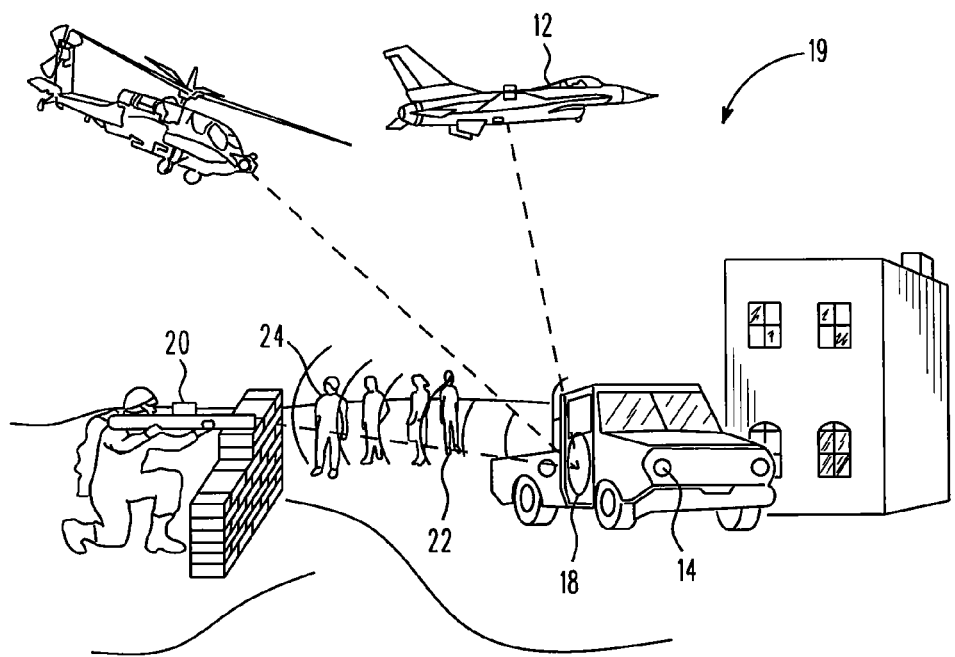
FIG. 1 is a simplified diagram of an illustrative scenario using a semi-active laser guidance system.

FIG. 1 is a simplified diagram of an illustrative scenario using a semi-active laser (SAL) guidance system 10. A laser designator 12, which may be onboard an aircraft or held by a ground warrior, is pointed at a target 14 with a modulated laser beam 16, forming a laser spot 18 on the target 14. A SAL seeker on a missile 20 senses the laser energy 22 reflected from the target 14 and guides the missile 20 toward the laser spot 18 on the target 14. If the laser designator 12 transmits at a non-eye safe wavelength, friendly forces and civilians 24 may unknowingly be subject to the reflected laser energy 22, putting them at risk of eye damage.

Figure 2:
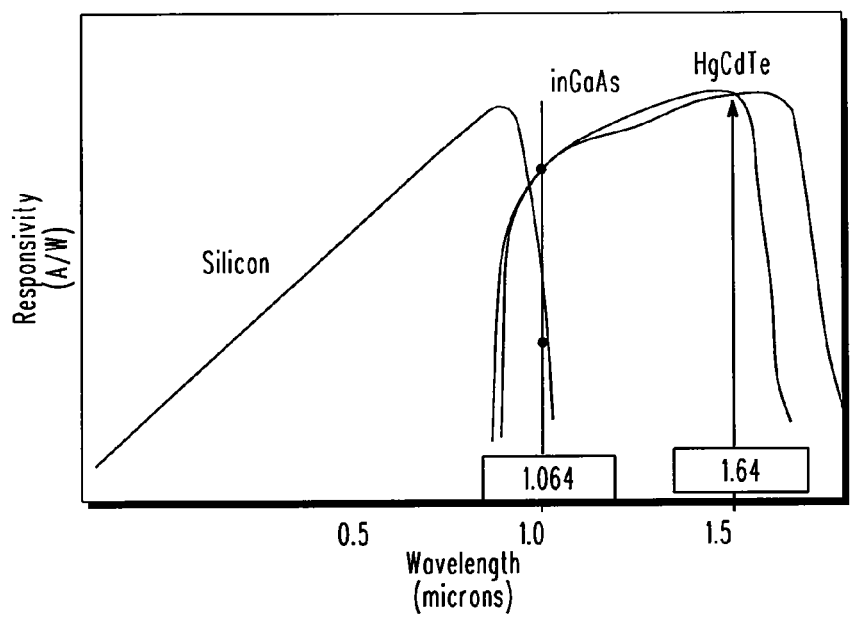
FIG. 2 is a graph showing responsivity vs. wavelength of three illustrative detector materials: silicon, InGaAs, and HgCdTe.

The present invention provides a novel sensor for laser guidance systems that is suitable for use with eye-safe laser designators. Unlike conventional silicon detectors, sensors made from newer materials such as InGaAs and HgCdTe can respond to eye-safe wavelengths (such as 1.54 μm or 1.64 μm), as well as conventional 1.06 μm lasers. FIG. 2 is a graph showing responsivity vs. wavelength of silicon, InGaAs, and HgCdTe. As discussed above; InGaAs and HgCdTe detectors typically can only be made in small sizes (less than 0.1 sq. in.), and therefore cannot provide a wide field of view using a conventional four-quadrant, body-fixed design.

Figure 3A:
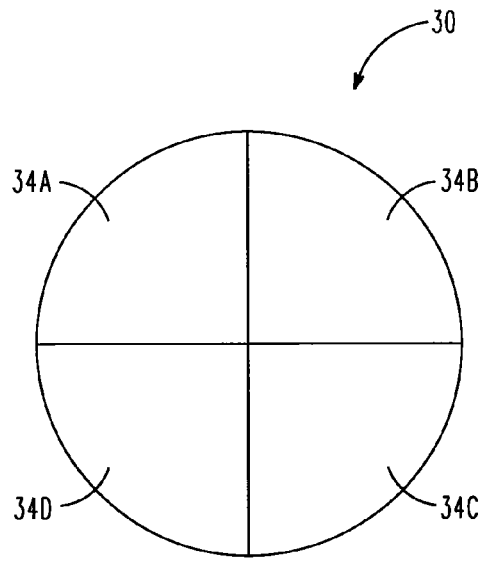
FIG. 3a is a simplified schematic of a conventional four-quadrant detector.
Figure 3B:
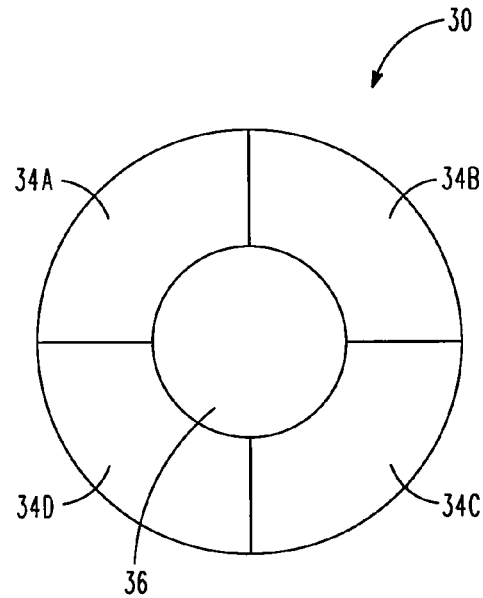
FIG. 3b is a simplified schematic of a conventional four-quadrant detector, showing a received laser spot that is centered.

FIG. 3a is a simplified schematic of a conventional four-quadrant detector 30. The four-quadrant detector 30 includes a single large detector that is electronically divided into four quadrants 34A, 34B, 34C, and 34D. In operation, the missile guidance system receives the amplitude levels measured by each quadrant and adjusts the heading of the missile until the received laser spot is centered in the detector 30 such that equal amounts of energy are detected in each quadrant 34A, 34B, 34C, and 34D. FIG. 3b is a simplified schematic of a conventional four-quadrant detector 30 showing a received laser spot 36 that is centered, indicating that the missile is heading toward the designated target.

Figure 4:
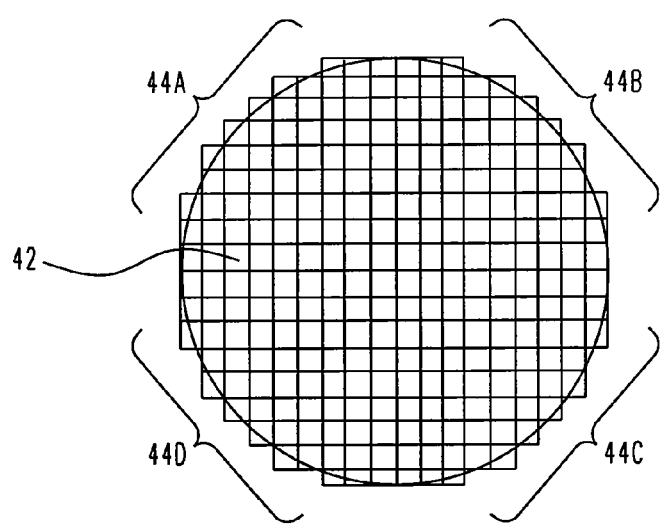
FIG. 4 is a simplified schematic of a detector array designed in accordance with an illustrative embodiment of the present invention.

The novel sensor of the present invention includes a multi-element detector array and readout integrated circuit (ROIC) that are compatible with conventional four-quadrant guidance systems. FIG. 4 is a simplified schematic of a detector array 40 designed in accordance with an illustrative embodiment of the present invention. The detector array 40 includes a plurality of detector elements 42. In a preferred embodiment, the detector elements 42 are fabricated from InGaAs or HgCdTe, and are therefore responsive to both eye-safe lasers and conventional 1.06 μm lasers. In the illustrative embodiment, the detector elements 42 are grouped into four subsets 44A, 44B, 44C, and 44D, to simulate a wide field of view, four-quadrant detector. In a preferred embodiment, the detector array 40 includes 256 individual elements, with each subset including 64 detector elements.

In the illustrative embodiment of FIG. 4, the detector elements 42 are arranged in a circular configuration. Alternatively, the detector elements 42 may be arranged in a square, rectangular, or other configuration. A circular configuration may be preferred for missile guidance applications, while a square or rectangular arrangement may be preferred for non-missile applications, such as a tracking system onboard an aircraft. Other detector array configurations and sizes may also be used without departing from the scope of the present teachings.

In accordance with the teachings of the present invention, the detector array 40 is coupled to a readout circuit adapted to receive signals from each individual detector element 42 and generate an output that is compatible with four-quadrant systems; that is, four parallel output signals that each represent the energy received in one of the four subsets.

Figure 5A:
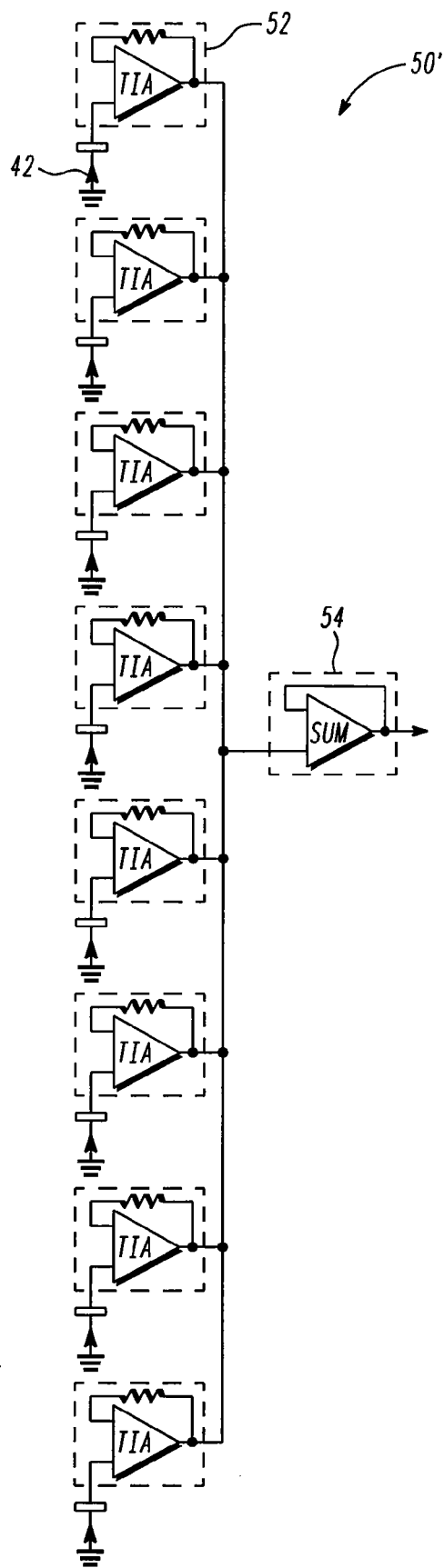
FIG. 5a is a simplified schematic of a simple readout circuit for generating the output signal for one detector array subset designed in accordance with an illustrative embodiment of the present invention.

FIG. 5a is a simplified schematic of a simple readout circuit 50' for generating the output signal for one detector array subset designed in accordance with an illustrative embodiment of the present invention. The readout circuit 50' includes a plurality of preamplifiers 52, each preamplifier 52 adapted to receive an amplitude measurement from a detector element 42 and output the received signal to a summing circuit 54. In the illustrative embodiment, the preamplifier 52 is implemented using a transimpedance amplifier (TIA). The summing circuit 54 adds the signals from each detector element of the array subset (only 8 detector elements are shown in FIG. 5a for simplicity) and outputs the resulting sum. Thus, the readout circuit 50' generates a single output signal representing the total energy received by the detector elements 42 in one subset. Similar readout circuits generate output signals for each of the other three subsets.

Figure 5B:
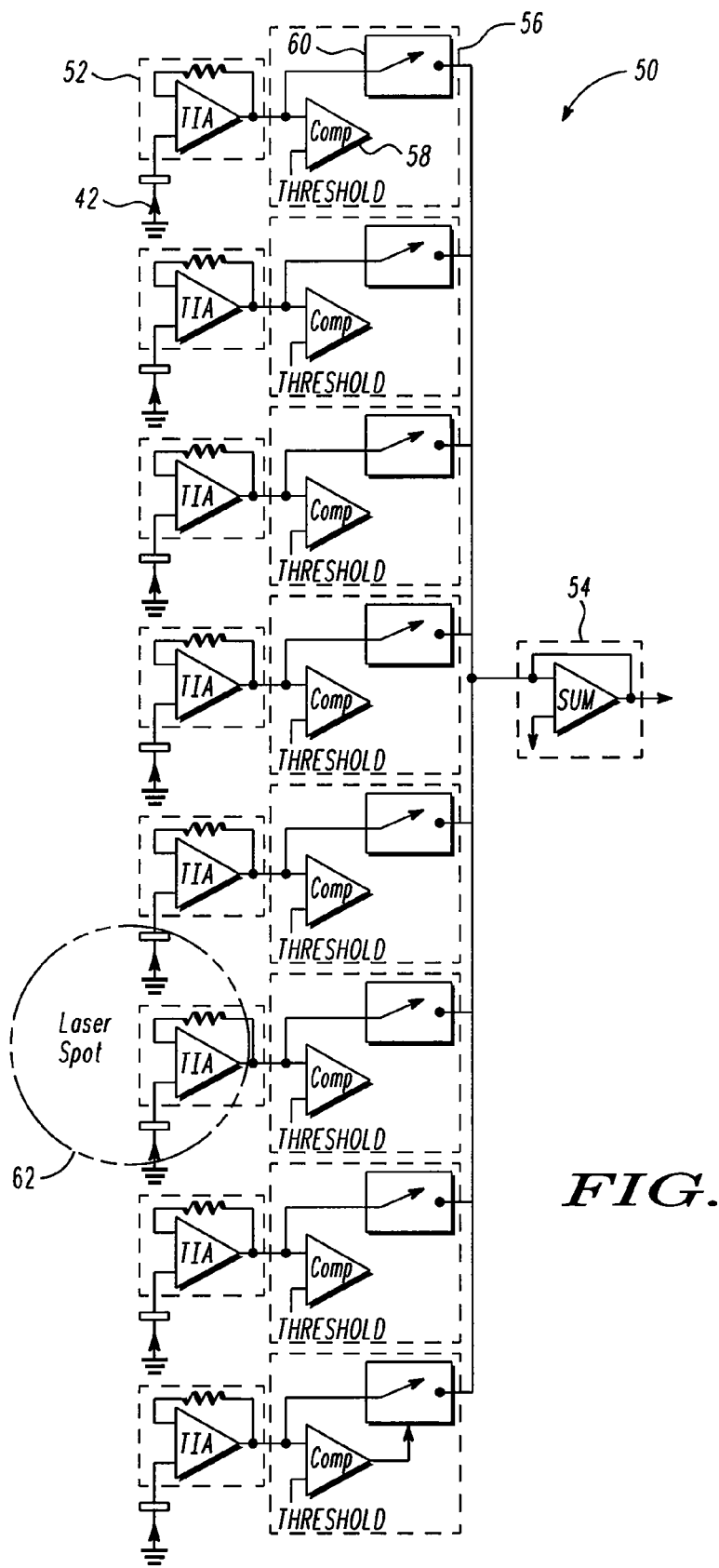
FIG. 5b is a simplified schematic of an improved readout circuit for generating the output signal for one detector array subset designed in accordance with an illustrative embodiment of the present invention.

FIG. 5b is a simplified schematic of an improved readout circuit 50 for generating the output signal for one detector array subset designed in accordance with an illustrative embodiment of the present invention. (Again, only 8 detector elements are shown in FIG. 5b for simplicity.) In the preferred embodiment, the readout circuit 50 also includes a noise gate or thresholding circuit 56 following each preamplifier 52 to improve the signal to noise ratio (SNR) of the sensor. The thresholding circuit 56 is adapted to remove noise from the detector signals, so that the noise is not summed by the summing circuit 54. In the illustrative embodiment, each thresholding circuit 56 includes a comparator 58 that receives the signal output from the preamplifier 52 and compares it to a predetermined threshold (the value of which is set to remove most of the noise, but allow a laser return). The output of the comparator 58 controls a switch 60. If the received signal is above the threshold, then the switch 60 is closed and allows the signal to be passed to the summing circuit 54. If the received signal is below the threshold, then the switch 60 is open and no signal is sent to the summing circuit 54.

Thus, the readout circuit 50 generates an output signal that is the sum of all channels that exceed threshold. Continuous summing over each subset (generating 4 output signals, each summing the 64 detector elements of one subset) provides an output that is compatible with existing four-quadrant guidance systems. Thresholding before summing eliminates noise from channels that do not contribute to the signal and may provide a sensor with improved SNR performance over conventional four-quadrant detectors. It may therefore be beneficial in certain applications to use a multi-element detector array configuration designed in accordance with the present teachings, even with conventional silicon detectors.

Figure 5C:
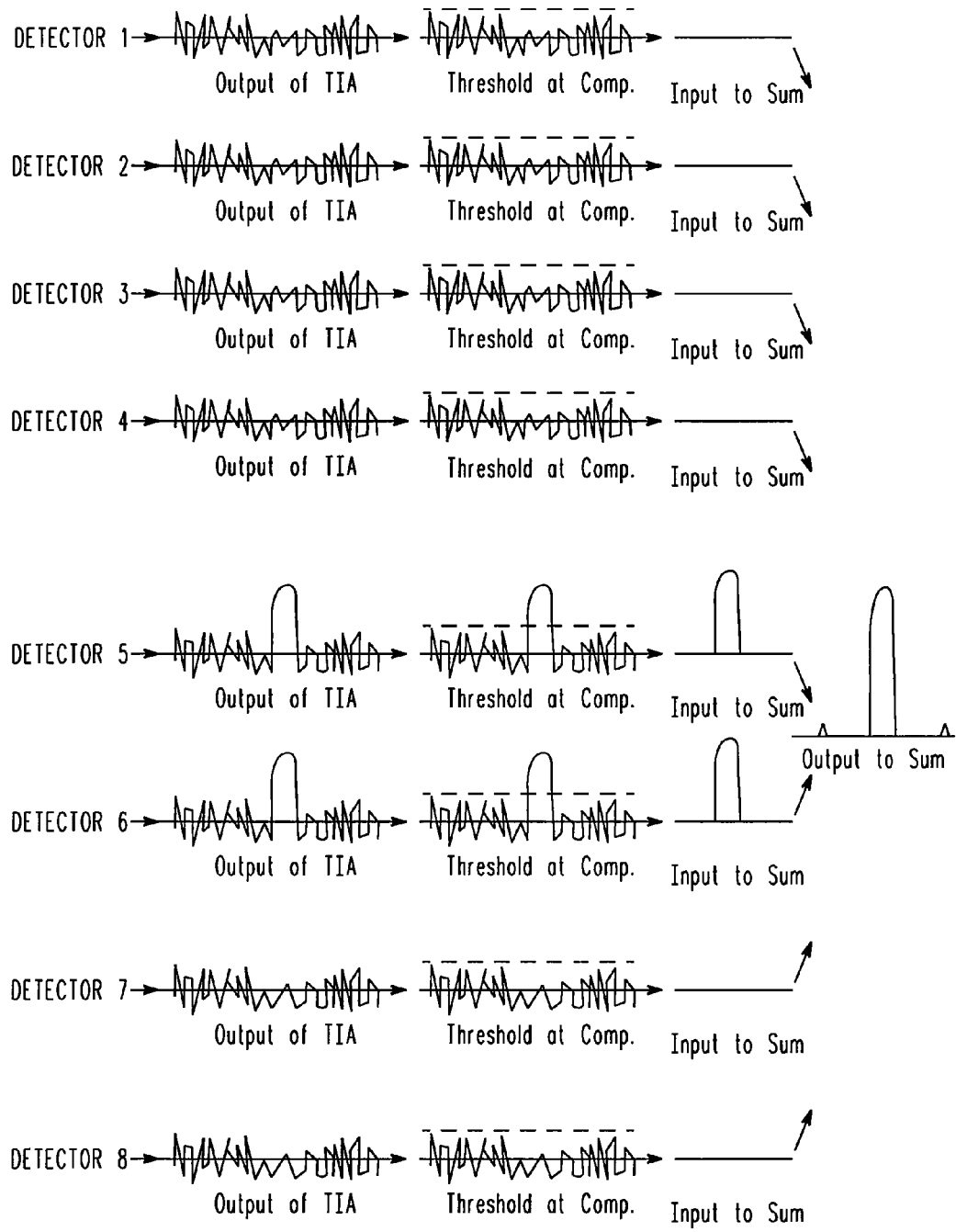
FIG. 5c shows illustrative signals at different points of a readout circuit designed in accordance with an illustrative embodiment of the present invention.

FIG. 5c shows illustrative signals at different points of the readout circuit 50 of FIG. 5b, showing example signals at the output of each preamplifier 52 (TIA), during thresholding at each comparator 58, at the output of each thresholding circuit 56, and at the output of the summing circuit 54. In this example, energy from a reflected laser spot 62 is incident upon two of the detector elements (as shown in FIG. 5b). As shown in FIG. 5c, the outputs of the preamplifiers 52 for these two detector elements includes both a large peak (from the laser spot) and noise. The thresholding circuit 56 removes most of the noise, allowing the signal from the laser spot to pass to the input of the summing circuit 54. The outputs of the preamplifiers 52 of the other detector elements (which do not receive the laser energy) include only noise. The thresholding circuit 56 removes the noise so that no signal is input to the summing circuit 54 from these detector channels. The output of the summing circuit 54 therefore contains the signal from the laser energy with very little noise.

The readout circuit 50 described above provides four-quadrant compatibility for a multi-element detector array. However, it does not take full advantage of the improved angle measurement resolution that is possible with a multi-element array.

FIG. 6 is a simplified schematic of a detector array 40 designed in accordance with an illustrative embodiment of the present invention, showing an example scenario in which energy from a laser spot 62 falls on a few detector elements 42 in one quadrant of the array 40. If the four-quadrant compatible output signals from the readout circuit described above are used to process the array 40, the guidance processing system only knows that the laser spot is in one particular quadrant. By processing the array 40 using each individual detector element output separately instead of summing into four quadrants, the processing system can determine exactly where in the quadrant the laser spot is, thereby improving the angle measurement accuracy that can be achieved. In addition, four-quadrant systems typically find the exact location of the laser spot by centering the received energy between the four quadrants. Processing the individual detector element outputs allows the processor to determine the exact location of the laser spot in the field of view without centering. This capability can be particularly useful for laser spot trackers that are used in body-fixed missile guidance and in applications other than missile guidance.

FIGS. 7a-7c show three examples of determining the location of a laser spot in accordance with the teachings of the present invention. In FIG. 7a, four detector elements each receive about 25% of the spot signal, indicating that the spot is centered between the four elements. In FIG. 7b, two detector elements each receive 30% of the spot signal, indicating that the spot is centered between the two detector elements. In FIG. 7c, one detector element receives 33% of the spot signal, indicating that the spot is centered on a single detector.

Figure 8:
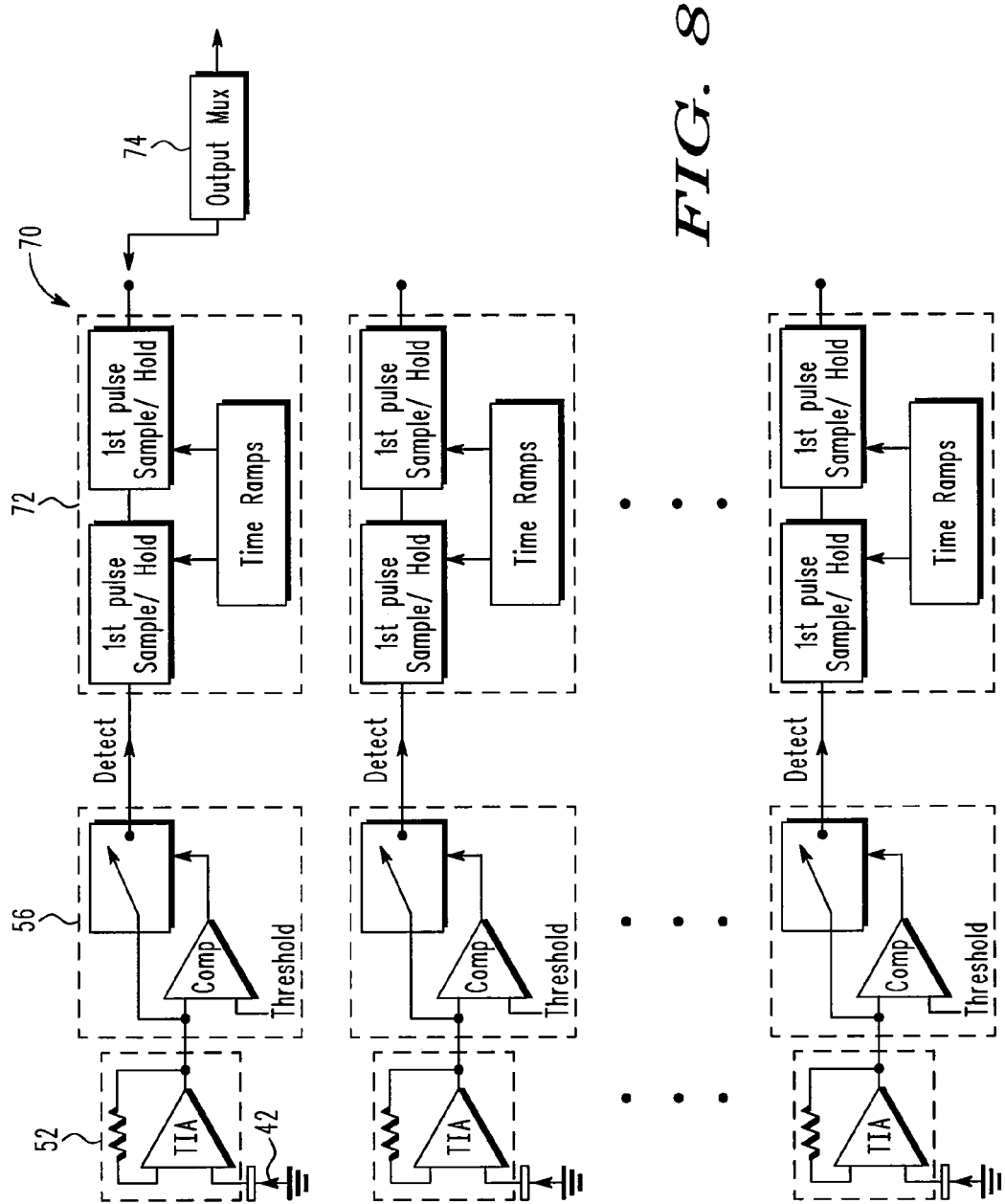
FIG. 8 is a simplified schematic of a readout circuit for generating a serial output signal including signals from each individual detector element of a multi-element array designed in accordance with an illustrative embodiment of the present invention.

FIG. 8 is a simplified schematic of a readout circuit 70 for generating a serial output including signals from each individual detector element of a multi-element array designed in accordance with an illustrative embodiment of the present invention. As in the four-quadrant compatible readout circuit 50, the individual readout circuit 70 includes a preamplifier 52 and following thresholding circuit 56 coupled to each detector element 42. Again, the thresholding circuits 56 are adapted to eliminate noise from each detector channel, but instead of summing over each quadrant, this readout circuit 70 is adapted to output the signals from each channel individually.

The readout circuit 70 may simply output all of the detector signals in parallel. However, this may not be practical for an array 40 with a large number of detector elements 42. In the illustrative embodiment of FIG. 8, the readout circuit 70 is adapted to read out the individual signals serially in a single serial output.

The readout circuit 70 may also include a recording circuit 72 coupled to each thresholding circuit 56 that records the time of arrival of a received signal as well as the amplitude of the signal. The laser designator of a guidance system typically transmits a modulated pulse train that is encoded so that the guidance system can identify the laser spot it is trying to track. The guidance system therefore typically needs to know the timing of the received pulses. When the detector signals are output in parallel, the guidance processing system can determine the timing of the pulses based on the time when the detectors receive and output signals. When the detector signals are output serially, however, the guidance processor is unable to determine when a signal was detected unless timing information is sent along with the detector signals. Hence, in the illustrative embodiment, the readout circuit 70 includes recording circuits 72 that record timing and amplitude information, both of which are multiplexed into the serial output signal.

As shown in FIG. 8, the output of each thresholding circuit 56 is input to a recording circuit 72. In the illustrative embodiment, the recording circuit 72 includes one or more sample and hold circuits that record the time of arrival (by sampling a time ramp signal) and amplitude of any threshold exceedance that occurs during an interval. The recorded values of each recording circuit 72 are input to a multiplexer (MUX) 74 at the end of each interval. The multiplexer 74 receives the recorded signals from each detector channel and outputs them sequentially, generating a single serial output that includes signals from all the detector elements. The serial output can then be used by the guidance processor to accurately determine the location of the laser spot.

In the illustrative embodiment of FIG. 8, all of the elements of the detector array (256 elements in the illustrative embodiment) are multiplexed into one serial output. Other configurations can also be used without departing from the scope of the present teachings. For example, the readout circuit may include four multiplexers, one for each subset of detectors, with each multiplexer generating a serial output that includes one fourth of the detector elements (e.g., detectors 1-64 by the first multiplexer, detectors 65-128 by the second multiplexer, detectors 129-192 by the third, and detectors 193-256 by the fourth). The number of multiplexers (and therefore the number of serial outputs) is a design parameter that can be changed depending on the application.

Figure 9:
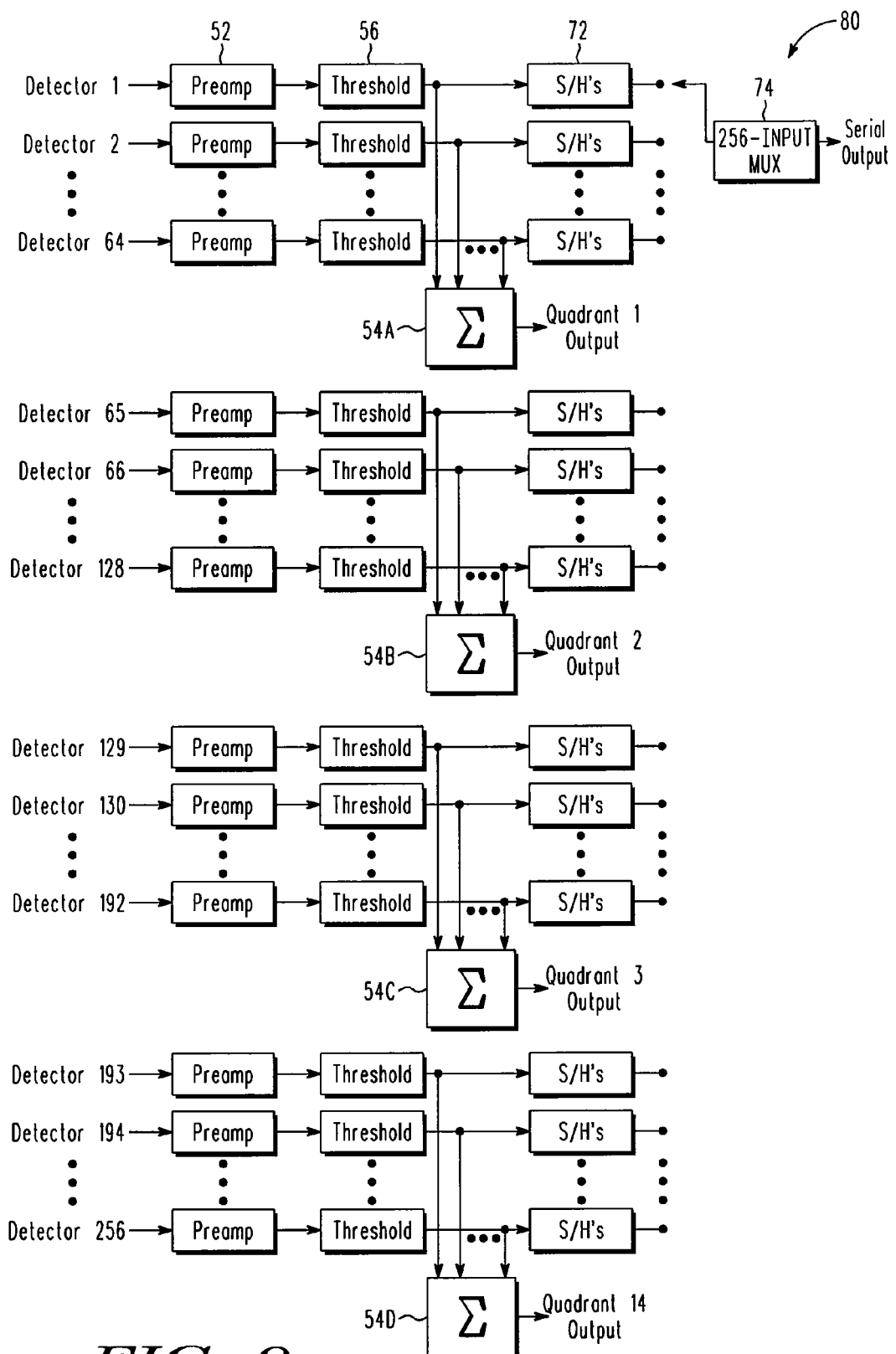
FIG. 9 is a simplified block diagram of a readout circuit with two output formats designed in accordance with an illustrative embodiment of the present invention.

In a preferred embodiment, the readout circuit provides two output formats: a four-quadrant signal compatible with existing laser guidance applications and also a serial output of the individual detector elements. FIG. 9 is a simplified block diagram of a readout circuit 80 with two output formats designed in accordance with an illustrative embodiment of the present invention. This readout circuit 80 combines the circuits shown in FIGS. 5b and 8.

In the illustrative embodiment, the readout circuit 80 uses a 256-channel processor, such that each detector element is processed in parallel. Each channel processes the signal from one detector element. As shown in FIG. 9, each channel includes a preamplifier 52 that receives the signal from the detector element, a thresholding circuit 56 that removes noise from the signal, and a recording circuit 72 that records the time of arrival and amplitude of the signal. A 256-input multiplexer 74 receives the recorded values from each channel and outputs them sequentially to form the serial output.

The readout circuit 80 also includes four summing circuits 54A, 54B, 54C, and 54D for providing the four-quadrant compatible output. The first summing circuit 54A adds the signals output by the thresholding circuits 56 for each detector element in the first quadrant (detectors 1-64). The second summing circuit 54B adds the signals output by the thresholding circuits 56 for each detector element in the second quadrant (detectors 65-128). The third summing circuit 54C adds the signals output by the thresholding circuits 56 for each detector element in the third quadrant (detectors 129-192). The fourth summing circuit 54D adds the signals output by the thresholding circuits 56 for each detector element in the fourth quadrant (detectors 193-256). The four output signals of the four summing circuits 54A, 54B, 54C, and 54D are read out in parallel, and form the four-quadrant compatible output of the readout circuit 80.

In the preferred embodiment, the readout circuit 80 is implemented as an integrated circuit coupled to the detector array 40. Other implementations may also be used without departing from the scope of the present teachings.

Figure 10:
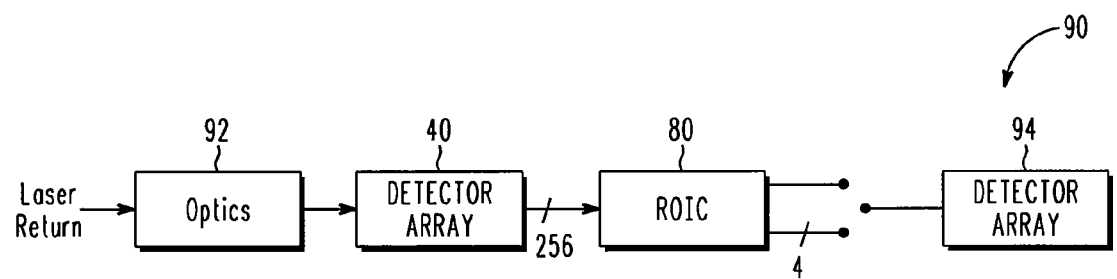
FIG. 10 is a simplified block diagram of a laser spot tracker designed in accordance with an illustrative embodiment of the present invention.

FIG. 10 is a simplified block diagram of a laser spot tracker 90 designed in accordance with an illustrative embodiment of the present invention. The novel spot tracker 90 includes optics 92 adapted to receive laser energy and direct it toward a detector array 40. The detector array 40 includes a plurality of detector elements 42 that are grouped into four subsets (as shown in FIG. 4). In an illustrative embodiment, the detector array 40 is a 256-element InGaAs PIN array. A readout circuit 80 receives the detected signals from each element of the detector array 40 and provides outputs in two formats: a serial output of each individual detector element and a four-quadrant compatible output (as shown in FIG. 9). A processor 94 receives either the serial output or the four-quadrant output and uses the received data to determine the location of the laser spot.

Alternatively, the processor 94 may be designed to receive both the serial output as well as the four-quadrant output. In certain applications, it may be useful to process both signals. For example, the four-quadrant output may be used in an initial "target acquisition" stage to detect the laser pulse signal, compare the signal with the designated coding scheme, and calculate an initial angle measurement. The system may then switch to a "target tracking" mode, in which the individual detector element signals are processed to provide a more accurate measurement of the laser spot's location. Individual detector processing may also provide improved acquisition range and weather penetration.

Thus, the present invention provides a novel sensor with a multi-element detector array suitable for eye-safe laser designators and a readout circuit that provides an output that is compatible with four-quadrant processing systems as well as an output including signals from each individual detector element. The sensor can therefore be used with both existing four-quadrant laser guidance applications and individual detector signal processing for body-fixed applications. In the illustrative embodiment, the sensor can be used with eye-safe laser designators as well as conventional 1.06 μm lasers.

The present invention has been described herein with reference to a particular embodiment for a particular application. Those having ordinary skill in the art and access to the present teachings will recognize additional modifications, applications and embodiments within the scope thereof For example, while the invention has been described with reference to a four-quadrant missile guidance system, the novel sensor may also be used in other applications without departing from the scope of the present teachings.

It is therefore intended by the appended claims to cover any and all such applications, modifications and embodiments within the scope of the present invention.

Accordingly,

What is claimed is:

1. An eye-safe laser sensor comprising:
    a detector array including at least four subsets, each subset comprising a plurality of detector elements fabricated from InGaAs or HgCdTe for detection of eye-safe laser wavelengths; and
    a readout circuit to generate a first output and a second output, the first output comprising a subset signal for each subset that represents total energy received in each subset, the second output comprising a detector signal for each detector element representing energy received by each individual detector element
    wherein the first output indicates a region of the detector array in which a laser spot is sensed, and
    wherein the second output indicates a location of the sensed laser spot within the region.

2. The sensor of claim 1 wherein the readout circuit comprises:
    circuitry to read out the subset signals in parallel; and
    circuitry to serially read out signals the detector signals from each of the detector elements.

3. The sensor of claim 1
    wherein the first output is for use in initial acquisition of the laser spot, and
    wherein the second output is for use in tracking the laser spot after the initial acquisition.

4. The sensor of claim 3 wherein each subset corresponds to a quadrant of the detector array, and
    wherein the subset signals correspond to quadrant output signals of a four-quadrant guidance system.

5. The invention sensor of claim 1 wherein the readout circuit comprises a summing circuit for each subset of detector elements to generate the subset signals, each summing circuit adapted to add thresholded signals from each detector element in a subset to generate the subset signal for the subset.

6. The sensor of claim 5 wherein the readout circuit further comprises a recording circuit coupled to each thresholding circuit, each recording circuit adapted to record an amplitude and a time of arrival of each thresholded signal for use in generating the detector signal for each detector element.

7. The sensor of claim 6 wherein the readout circuit further comprises:
    a preamplifier coupled to each detector element, each preamplifier adapted to output a received detector signal;
    a thresholding circuit coupled to each preamplifier, each thresholding circuit adapted to remove noise lower than a predetermined threshold from a detector signal to generate a thresholded signal;
    sample and hold circuits for each detector element to recode the amplitude of each thresholded signal; and
    a multiplexer adapted to serially read out the recorded amplitude and time from each of the detector elements to provide the second output.

8. The sensor of claim 1 wherein the detector elements have a size of less than 0.1 square inches.

9. A readout circuit comprising:
    a first circuitry to receive signals from each of a plurality of detector elements fabricated from InGaAs or HgCdTe for detection of eye-safe laser wavelengths, wherein the detector elements are grouped into at least four subsets;

a second circuitry to threshold each signal to remove noise below a predetermined threshold;

a third circuitry to generate a first output comprising a subset signal for each subset by adding thresholded signals from each detector element in a subset; and fourth circuitry to generate a second output comprising a detector signal for each detector element representing energy received by each individual detector element.

10. The readout circuit of claim 9 comprising circuitry to read out the subset signals in parallel and circuitry to serially read out signals the detector signals from each of the detector elements, wherein the plurality of detector elements comprise a detector array, wherein the first output indicates a region of the detector array in which a laser spot is sensed, and wherein the second output indicates a location of the sensed laser spot within the region.

11. The readout circuit of claim 10 further comprising circuitry for recording an amplitude and a time of arrival of each thresholded signal.

12. The readout circuit of claim 11 further comprising a multiplexer to serially read out the recorded amplitude and time from each of the detector elements.

13. The readout circuit of claim 9 wherein the first circuitry comprises a plurality of transimpedance amplifiers, each amplifier coupled to a detector element and adapted to output a received detector signal, wherein the second-circuitry comprises a plurality of thresholding circuits, each thresholding circuit coupled to a transimpedance amplifier, and wherein each thresholding circuit comprises:

a comparator adapted to compare a detector signal with a predetermined threshold and in accordance therewith generate a control signal; and a switch adapted to receive the control signal and in accordance therewith open or close to couple the amplifier output to an output of the thresholding circuit.

14. The readout circuit of claim 9 wherein the third circuitry comprises a summing circuit for each subset of detector elements to generate the first output, each summing circuit adapted to add thresholded signals from each detector element in a subset to generate an output signal for the subset.

15. The readout circuit of claim 9 wherein the detector elements have a size of less than 0.1 square inches.

16. A method for processing a detector array comprising:

dividing the detector array into at least four subsets, each subset including a plurality of detector elements for detection of eye-safe laser wavelengths;

thresholding detected signals received from the detector elements to remove noise below a predetermined threshold;

summing the thresholded signals in each subset to generate a subset signal for each subset;

providing a first output comprising the subset signals, the first output indicating a region of the detector array in which a laser spot is sensed; and providing a second output comprising the thresholded signals from each individual detector element, the second output indicating a location of the sensed laser spot within the region.

17. The method of claim 16 further comprising:

using the first output for initial acquisition of the laser spot, and using the second output for tracking the laser spot after the initial acquisition.

18. A laser spot tracker for tracking an eye-safe laser spot comprising:

a detector array including a predetermined number of subsets, each subset including a plurality of detector elements fabricated from InGaAs or HgCdTe for detection of eye-safe laser wavelengths;

a readout circuit coupled to generate first and second outputs, the first output comprising a subset signal from each subset that represents a total energy received by detector elements in the subset, the second output comprising a detector signal for each detector element representing energy received by each individual detector element; and a processor adapted to receive the first and second outputs from the readout circuit and to determine a position of the laser spot within the detector array, wherein the first output indicates a region of the detector array in which the laser spot is sensed for use by the processor in initial acquisition of the laser spot, and wherein the second output indicates a location of the laser spot within the region for use by the processor in tracking the laser spot after the initial acquisition.

19. The laser spot tracker of claim 18 wherein the detector elements have a size of less than 0.1 square inches.

* * * * *

UNITED STATES PATENT AND TRADEMARK OFFICE
CERTIFICATE OF CORRECTION

| | | |
|---|---|---|
| PATENT NO. | : 7,842,908 B2 | Page 1 of 1 |
| APPLICATION NO. | : 11/891982 | |
| DATED | : November 30, 2010 | |
| INVENTOR(S) | : Clarence C. Andressen | |

It is certified that error appears in the above-identified patent and that said Letters Patent is hereby corrected as shown below:

In column 8, line 19, in Claim 1, delete "element" and insert -- element, --, therefor.

In column 8, line 38, in Claim 5, after "The" delete "invention".

In column 8, line 66, in Claim 9, before "first" delete "a".

In column 9, line 3, in Claim 9, before "second" delete "a".

In column 9, line 5, in Claim 9, before "third" delete "a".

In column 9, line 11, in Claim 10, after "9" insert -- further --.

Signed and Sealed this

Fifteenth Day of February, 2011

David J. Kappos
*Director of the United States Patent and Trademark Office*